July 3, 1923.

L. B. HUNTINGTON

FISH BAIT OR LURE

Filed Dec. 21, 1921

1,460,905

L. B. Huntington, INVENTOR.

BY Geo. F. Kimmel, ATTORNEY.

Patented July 3, 1923.

1,460,905

UNITED STATES PATENT OFFICE.

LEVIN B. HUNTINGTON, OF ANNAPOLIS, MARYLAND.

FISH BAIT OR LURE.

Application filed December 21, 1921. Serial No. 523,893.

*To all whom it may concern:*

Be it known that I, LEVIN B. HUNTINGTON, a citizen of the United States, residing at Annapolis, in the county of Anne Arundel and State of Maryland, have invented certain new and useful Improvements in Fish Bait or Lures, of which the following is a specification.

This invention appertains to an improvement in artificial bait for the catching of fish, and more particularly to a lure or spoon type thereof adapted to attract the fish to the same by its movements in the water during the casting and reeling in of the line to which the lure is attached.

The principal object of the invention is to provide for a bait or lure of the class mentioned, and one of a construction and arrangement designed to effect extremely erratic motions or jumping movements in the water during the dragging or reeling in of the line to which the same is attached, such as lends to the effectiveness thereof in attracting fish to the hook carried thereby.

Another object of the invention is to provide for a bait or lure of the type specified, and one constructed and arranged on curved lines, whereby to impart to the same the erratic motions or jumping movements as aforesaid, and, in addition thereto, to effect relatively shorter and quicker motions or movements in all directions, between the longer of the jumping motions or movements made thereby.

A further object of the invention is to provide for a bait, lure or spoon as hereinbefore characterized, and one having a hook secured thereto in an extremely simple manner and so arranged that the same is well concealed for all practical purposes, by reason of such manner of securing and the otherwise peculiar curvature of the metal forming the rear end or tail portion of the lure or spoon.

With the foregoing and other objects in view, the invention resides in the certain new and useful construction and arrangement of parts as will be hereinafter more fully described, set forth in the appended claims, and illustrated in the accompanying drawing, in which:—

Figure 1:
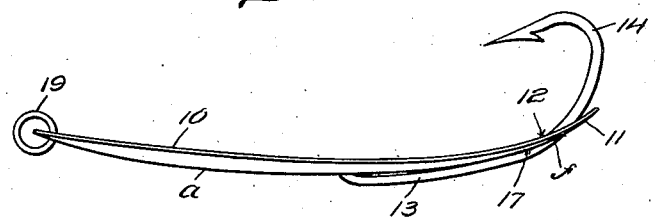
Figure 2:
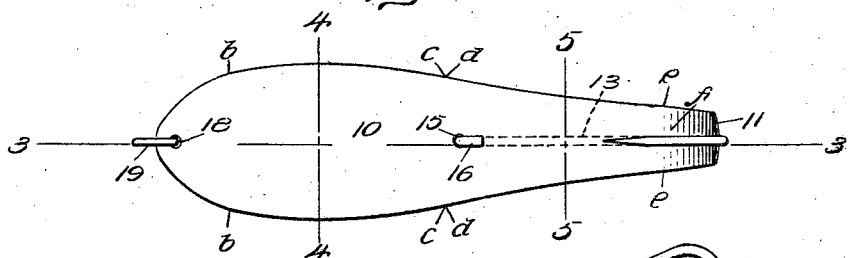
Figure 3:
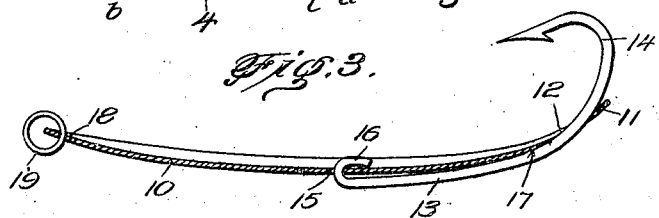
Figure 4:
Figure 5:

Figure 1 is a side elevation of a preferred embodiment of the artificial bait, lure or spoon, Figure 2 is a view looking at the inner side thereof, Figure 3 is a longitudinal section taken on the line 3—3 of Figure 2, Figure 4 is a transverse section taken on the line 4—4 of Figure 2, and, Figure 5 is a similar sectional view taken on the line 5—5 of Figure 2.

Referring to the drawing, the preferred embodiment of the artificial bait, lure or spoon as shown thereon, comprises a metal body 10 having the general outline of the handle portion of a spoon and is otherwise concavo-convex in form with the greatest depth of the concavity thereof slightly inward from the forward end of the same, as at $a$, and gradually lessening in depth rearwardly of the body to the tail end portion 11, when the curvature is practically nil. As will be readily apparent, the opposite side edges of the broader forward portion of the body are curved in an outward direction, as between points $b$, $c$, while the rearwardly tapering side edges of the narrower rear portions are reversely curved with respect thereto, or in directions inwardly of the body, as between the points $d$, $e$. The longitudinal curvature of the body rearwardly from the greatest depth $a$ of the concavity therein diminishes with an increasing rapidity to its point of connection $f$ with the tail portion 11, where it breaks sharply into the latter, while the transverse curvature of the concaved side of the body decreases more gradually from the point of greatest depth $a$ thereof and practically disappears, or nearly so, at the tail portion 11.

Formed medially of the body 10, and substantially on the point of connection $f$ thereof with the tail portion 11, is a slightly elongated opening 12 through which is extended the shank portion 13 of a hook 14, which is curved in a forward direction over the outer surface of the rearwardly tapering portion of the body 10, and rests on the longitudinal center thereof. The free end portion of the shank 13 extends to a point slightly in rear of the transverse center of the body 10, where its free end is passed inwardly through an opening 15, formed in the body 10, and is bent into engagement therewith, the bent end portion 16, of the shank 13, extending in a rearward direction from the opening and lays within the confines of the concavity, substantially as shown. To assure of the shank portion 13 closely hugging the outer surface of the body 10, the latter is grooved as at 17, for a distance forwardly from the opening 12 for the purpose. The hooked end portion 14 curves upwardly and rearwardly from the opening 12, and then in a forwardly direction in a manner to provide a substantially straight ended hook declining slightly downward from the high point of the curved portion thereof, and consequently underlies the concaved side of the body 10 in the plane of the longitudinal center thereof.

In the use of the artificial bait, lure or spoon, the same is to be attached to a line, (not shown) in the usual manner of such devices, the forward end or nose of the body 10 having an opening 18 formed therein and in which is engaged a ring 19 to which the free end of a fishing line is to be secured, for the purpose. After the lure has been properly attached to a line, a cast is made with the same, and upon the reeling in or otherwise pulling or dragging of the line, the lure will promptly begin a series of erratic motions or irregular movements, closely simulating the struggles of a crippled fish, and, in actual use, has proven to be very effective in attracting live fish to the same, and to an extent not obtained with now known types of such lures or baits.

Having thus fully described the invention, what is claimed, is:—

1. In a device as characterized, the combination of an elongated plate of concavo-convex form, both longitudinally and transversely, and having a broad portion disposed inwardly from a pointed front end portion and a rear portion tapering rearwardly from the broad portion, the longitudinal curvature of the plate gradually increasing in sharpness rearwardly from the broad portion throughout the major length of the rearwardly tapered portion, and rapidly increasing in sharpness at the extreme end of the tapered portion, whereby its motion in use simulates the erratic and irregular movements of a crippled fish, and a hook having its shank portion arranged against the lower face of said plate at the longitudinal center thereof, said shank extended up through said plate at two points and overlapping the upper face of the plate.

2. In a device as characterized, the combination of an elongated plate provided with a pair of openings and having the general outline of the handle portion of a spoon, and concavo-convex in both its longitudinal and transverse directions, the greatest depth of the concavity of the plate being at a point forwardly of the transverse center thereof and gradually diminishing in the rearward direction to a point slightly inward from the extreme rear end of the same, the longitudinal curvature of the plate gradually increasing in sharpness rearwardly from the point of greatest depth of the concavity therein throughout the major length of the rear portion, whereby the motion of the plate in use simulates the erratic and irregular movements of a crippled fish, and a hook having its shank portion arranged against the lower face of said plate at the longitudinal center thereof and extended up through the plates at two points, said shank bent against the upper face of the plate intermediate the ends of the latter and said hook having its bill overhanging the upper face of the plate at the rear end thereof.

3. In a device as characterized, the combination of an elongated plate having the general outline of the handle portion of a spoon and of concavo-convex form in both of its longitudinal and transverse directions, the greatest depth of the concavity of the plate being at a point substantially medial between the transverse center thereof and the forward end of the same and gradually diminishing in depth in the rearward direction to a point slightly inward of the extreme rear end of the plate, the longitudinal curvature of the plate gradually increasing in sharpness rearwardly from the point of greatest depth of the concavity thereof throughout the major length of the rear portion and from thence with a more rapid increase in sharpness to the extreme end of the same, whereby the motion of the plate in use simulates the erratic and irregular movements of a crippled fish, and a hook having its shank portion passed through one of said openings formed slightly inwardly of the rear end of the plate with the bill of the hook extended forwardly, said shank portion positioned against the lower face of the plate and passed through the other of said openings and bent into engagement with the upper face of the plate.

4. In a device for the purpose set forth, an elongated plate having the general outline of the handle portion of a spoon and a concavo-convex form in longitudinal and transverse directions, said plate provided with a pair of openings at the longitudinal center thereof, one of said openings positioned intermediate the ends of the plate and the other of said openings at the rear end thereof, said plate having its lower face provided with a groove leading to the opening in the rear end of the plate, and a hook having its shank portion positioned against the lower face of the plate and extending through said groove and through the said openings, said hook having its bill projecting forwardly from the rear end of the plate and the free terminus of its shank overlapping and engaging the upper face of the plate.

In testimony whereof, I affix my signature hereto.

LEVIN B. HUNTINGTON.